(12) United States Patent
Erickson et al.

(10) Patent No.: US 8,205,844 B1
(45) Date of Patent: Jun. 26, 2012

(54) CONNECTOR ASSEMBLY

(75) Inventors: Roger L. Erickson, Comstock Park, MI (US); Charles J. Steffens, Ada, MI (US)

(73) Assignee: Steffens Enterprises, Inc., Caledonia, MI (US)

( * ) Notice: Subject to any disclaimer, the term of this patent is extended or adjusted under 35 U.S.C. 154(b) by 0 days.

(21) Appl. No.: 13/033,176

(22) Filed: Feb. 23, 2011

(51) Int. Cl.
*A47B 96/00* (2006.01)

(52) U.S. Cl. ......... 248/222.11; 40/649; 40/658; 24/563; 248/489; 248/316.7

(58) Field of Classification Search .................. 248/489, 248/316.7, 316.5, 316.1, 495; 40/649, 658; 24/563, 545, 3.12, 67.9
See application file for complete search history.

(56) References Cited

U.S. PATENT DOCUMENTS

| | | | | |
|---|---|---|---|---|
| 4,358,917 A * | 11/1982 | Oda et al. | ...................... | 52/716.5 |
| 4,564,165 A * | 1/1986 | Grant et al. | .................... | 248/343 |
| 4,827,565 A | 5/1989 | Froutzis | | |
| 5,584,461 A * | 12/1996 | Pynenburg | ................. | 248/475.1 |
| 5,593,122 A | 1/1997 | Robertson et al. | | |
| 6,327,758 B1 * | 12/2001 | Petrakis et al. | ................. | 24/546 |
| 6,470,613 B1 * | 10/2002 | Wildrick | .................... | 40/661.03 |
| 6,546,658 B2 * | 4/2003 | Pitcher et al. | .................... | 40/658 |
| 6,622,410 B2 * | 9/2003 | Wilkes et al. | .................... | 40/654 |
| 6,779,771 B2 * | 8/2004 | Ostrovsky et al. | ......... | 248/316.7 |
| 7,076,899 B2 * | 7/2006 | Pitcher et al. | ............. | 40/611.02 |
| 7,325,348 B2 * | 2/2008 | Mueller et al. | .................. | 40/649 |
| 7,699,286 B2 * | 4/2010 | Brinkman et al. | ............ | 248/489 |
| 2001/0042331 A1 * | 11/2001 | Ostrovsky | ....................... | 40/793 |

* cited by examiner

*Primary Examiner* — Terrell McKinnon
*Assistant Examiner* — Monica Millner
(74) *Attorney, Agent, or Firm* — Warner Norcross & Judd LLP

(57) ABSTRACT

The present invention relates to an improved connector assembly for attaching objects to supports. The connector assembly has both a male connector and a female connector capable of being removably attached to each other. The male connector includes an engagement portion that extends from a contact surface and a support structure for attaching to an accessory. The female connector includes a hooked portion that extends from a female contact surface and receives the engagement portion of the male connector. Once connected, the male contact surface and the female contact surface may contact each other. The female connector may be attached to a structure, such as a wall, a free standing structure, or other attachment structure. Further, the male connector may be connected at various locations along the female connector, providing flexibility to attach the male connector at more than one location.

17 Claims, 8 Drawing Sheets

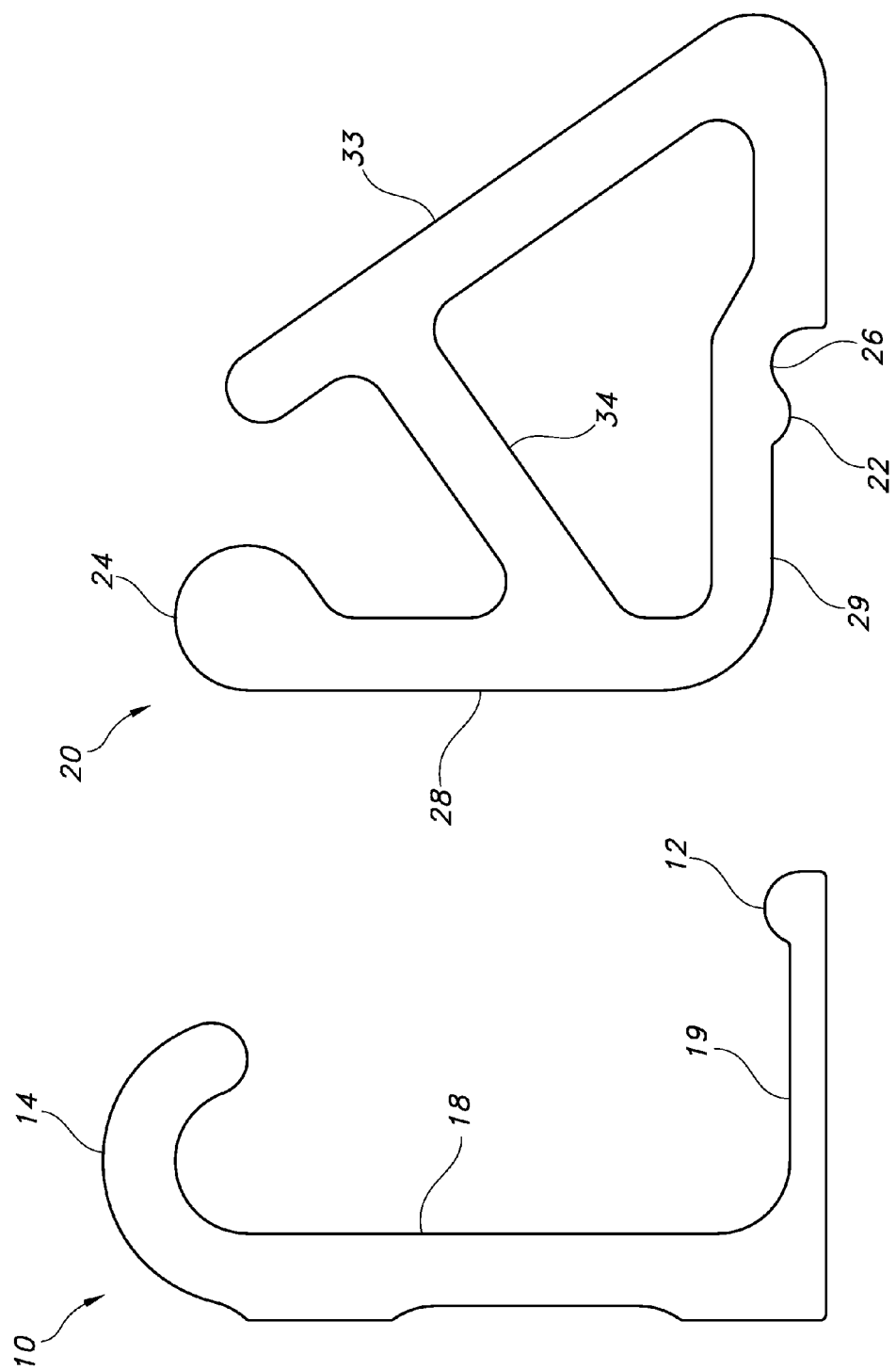

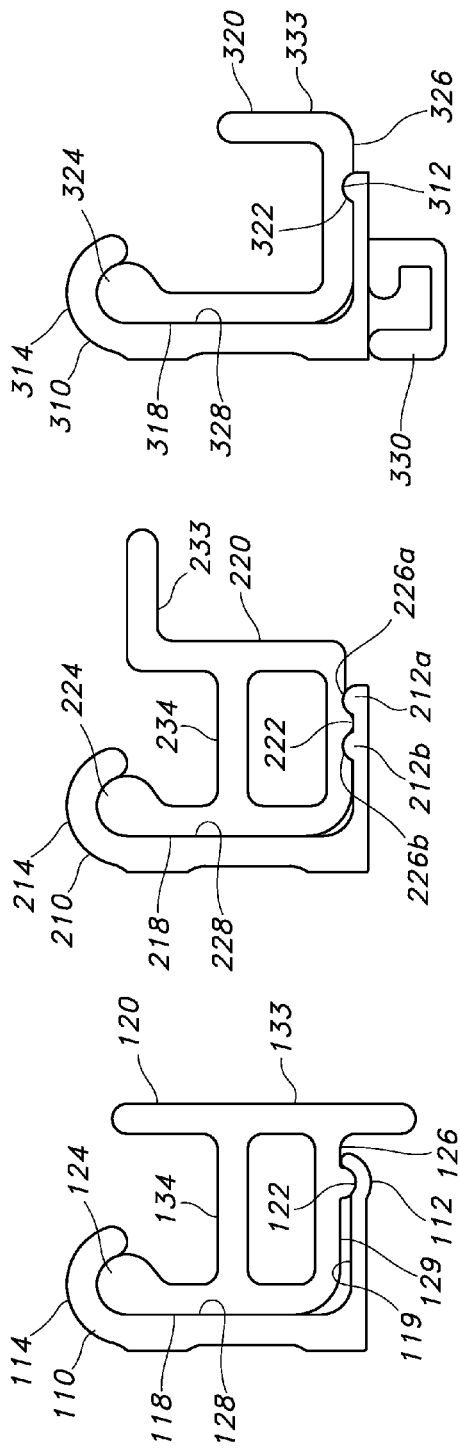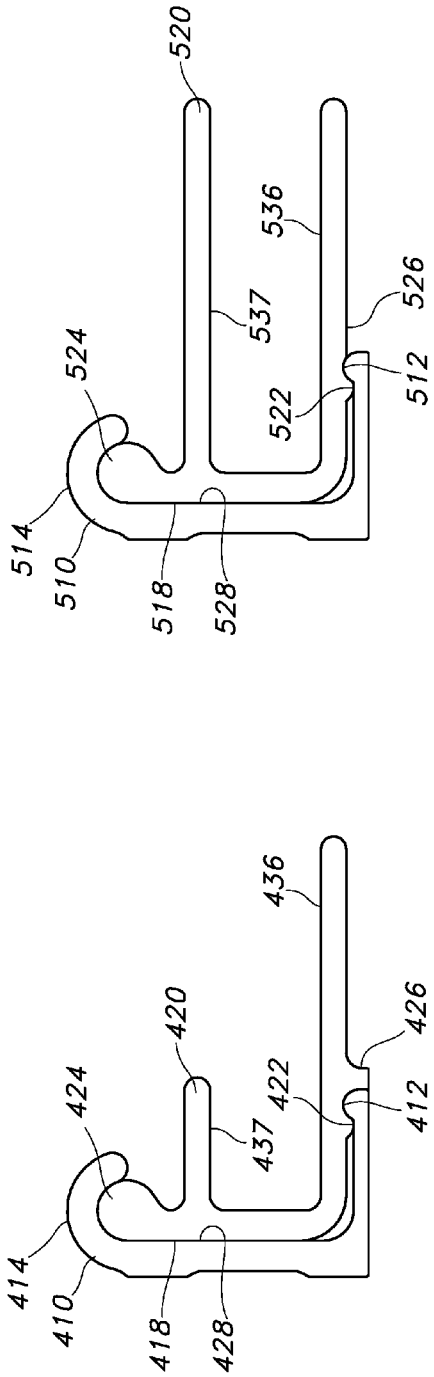

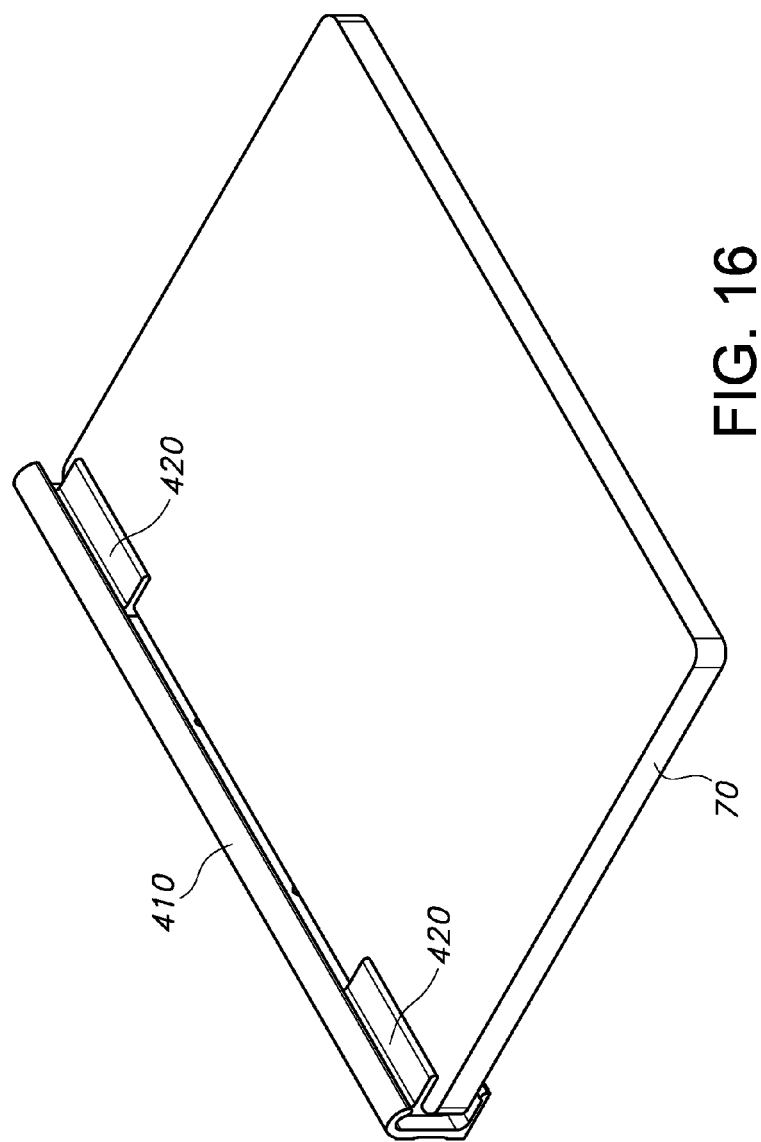
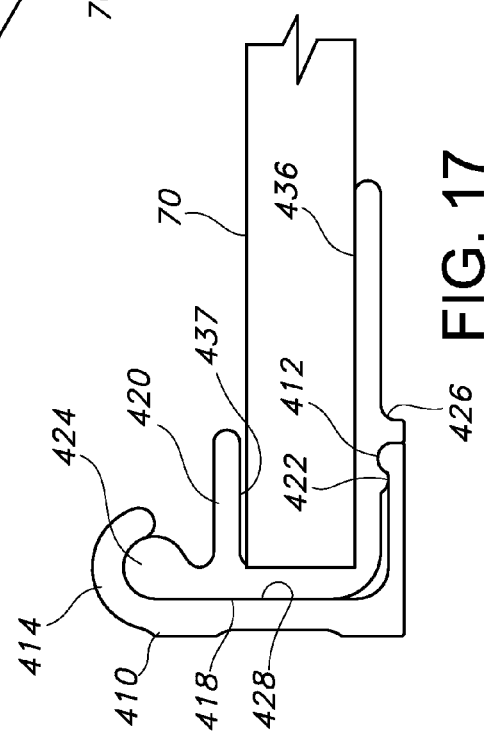

CONNECTOR ASSEMBLY

FIELD OF THE INVENTION

The present invention relates to a connector assembly, and more particularly to a snap-fit connector assembly.

BACKGROUND OF THE INVENTION

Brackets for supporting accessories are well known in the art. In conventional applications, an accessory, including components and other objects, may be attached to an attachment structure, such as a fixture or a freestanding structure, via a bracket. Fasteners may be used to secure (a) the bracket to the attachment structure and (b) the bracket to the accessory. In this way, the accessory is permanently affixed to a specific location on the attachment structure.

Conventional separable connectors may allow accessories to be detachably affixed to the attachment structure. But in many cases, the strength of these separable connectors is less than that of a bracket. More specifically, the locking mechanisms for separable connectors are not as strong as the typical fasteners used for a bracket.

This is especially true for separable connectors that allow spatial freedom with respect to the attachment structure. In general, if a separable connector allows freedom of choice with respect to an attachment location, then the locking mechanism is less secure and the strength of the connection between the accessory and the attachment structure is weaker.

Additionally, operation of the locking mechanism for conventional separable connectors may become more demanding as the desired strength of the connection between the accessory and the attachment structures increases. Thus, there exists a need in the art for a separable connector with improved strength and operability. Further, a separable connector having these attributes and spatial freedom with respect to the attachment structure is desired.

SUMMARY OF THE INVENTION

The present invention relates to an improved connector assembly for attaching objects together. The connector assembly has both a male connector and a female connector capable of being removably attached to each other. The male connector includes an engagement portion that extends from a male contact surface and a support structure for attaching to an accessory. The female connector includes a hooked portion that extends from a female contact surface and receives the engagement portion of the male connector. Once connected, the male contact surface and the female contact surface may contact each other. The female connector may be attached to a structure, such as a wall, a free standing structure, or other attachment structure. Further, the male connector may be connected at various locations along the female connector, providing flexibility to attach the male connector at more than one location.

In one embodiment, the female connector includes a snap ledge that extends from the female contact surface opposite the hooked portion. The snap ledge has a mating surface that engages a curved surface of the male connector. More specifically, the mating surface of the snap ledge may have at least one ridge that engages at least one groove of the male connector. Additionally, the snap ledge may deflect as the connector assembly is snap-fitted or locked together.

In alternative embodiments, the locking configuration between the mating surface and the curved surface of the male connector may be changed depending on the desired locking and unlocking forces or the engagement and disengagement forces. For example, additional ridges and grooves may be used to increase the amount of force called for to lock the connector assembly. Further, the size and shape of the ridges and grooves may be adapted to change the locking and unlocking forces.

Additional alternative embodiments may include various mounting structures for attaching objects to the connector assembly. For example, the connector assembly may be configured to support a mouse holder or a cantilevered shelf.

The connector assembly herein provides a separable attachment mechanism with improved strength and ease of use. Additionally, the connector assembly allows a user freedom of choice as to the location of attachment between objects. These and other advantages and features of the connector will be more fully understood and appreciated by reference to the description of the current embodiments and the drawings.

BRIEF DESCRIPTION OF THE DRAWINGS

FIG. 2 is a cross section view of the female portion of the snap-fit connector of the current embodiment.

FIG. 3 is a cross section view of the male portion of the snap-fit connector of the current embodiment.

FIG. 11 is a cross section view of a snap-fit connector of a second embodiment.

FIG. 12 is a cross section view of a snap-fit connector of a third embodiment.

FIG. 13 is a cross section view of a snap-fit connector of a fourth embodiment.

FIG. 14 is a cross section view of a snap-fit connector of a fifth embodiment.

FIG. 15 is a cross section view of a snap-fit connector of a sixth embodiment.

FIG. 16 is a perspective view of the snap-fit connector of the fifth embodiment and a shelf accessory.

FIG. 17 is a partial cross section view of the snap-fit connector of the fifth embodiment and the shelf accessory.

DESCRIPTION OF THE CURRENT EMBODIMENTS

Figure 1:
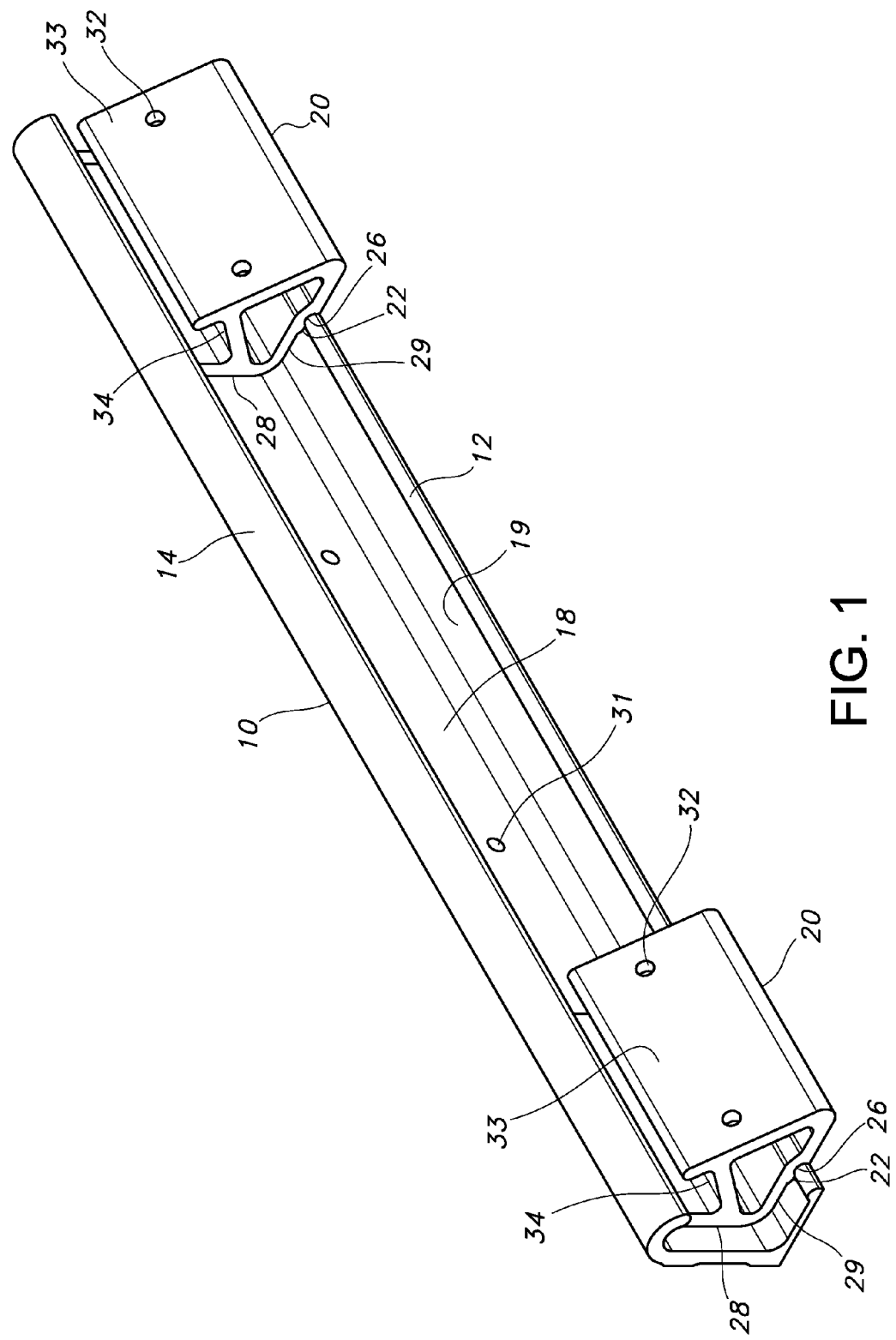
FIG. 1 is a perspective view of a snap-fit connector of a current embodiment.

Before the embodiments of the connector assembly are described, it is pointed out that the connector assembly is not limited in its application to the details of construction and the arrangement of the components set forth in the following description or illustrated in the drawings. The connector assembly is capable of other embodiments and of being practiced or being carried out in various ways. Also, it is pointed out that the phraseology and terminology used herein are for the purpose of description and should not be regarded as limiting. The use of "including" and "comprising" and variations thereof is meant to encompass the items listed thereafter and equivalents thereof, as well as additional items and equivalents thereof.

I. First Embodiment

Figure 4:
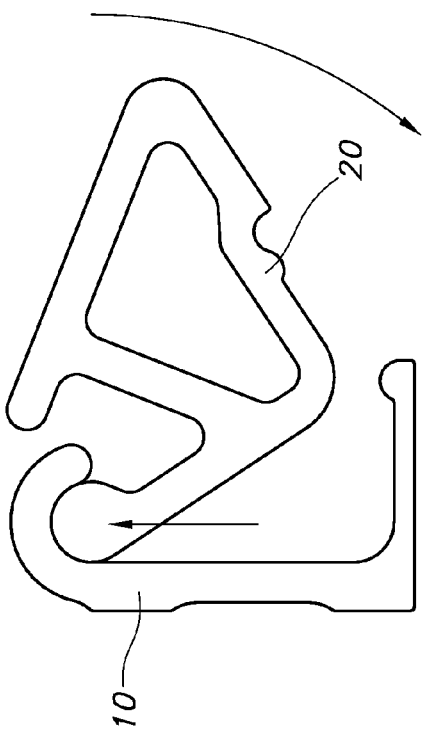
FIG. 4 is a cross section view of the snap-fit connector of the current embodiment being engaged.
Figure 5:
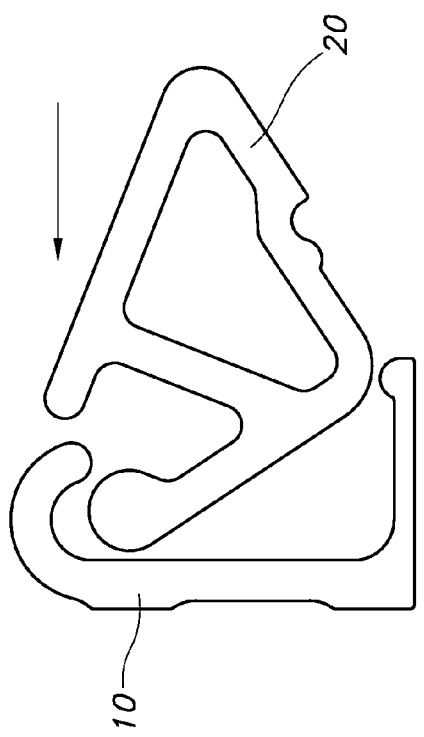
FIG. 5 is a cross section view of the snap-fit connector of the current embodiment being engaged.

An illustration of the current embodiment of a connector assembly is shown in FIGS. 2-4. The connector assembly includes both a male connector 20 and a female connector 10. The male connector 20 and the female connector 10 may have a substantially uniform cross section along the length of each connector such that both form a rail. The length of the female connector 10 may be significantly larger than the length of the male connector 20 to allow placement of the male connector 20 at different locations or for engagement of more than one male connector 20 with the female connector 10. The male connector 20 is designed to engage the female connector 10 such that it may be snapped in place and removed. Further, once removed, the male connector 20 may replaced at a different location along the rail of the female connector 10. The engagement configuration between the male connector 20 and the female connector 10 may become more firm as the applied force on the male connector 20 increases.

The female connector 10 and the male connector 20 may be constructed from materials such as metal, plastic, or other suitable materials, as desired. Both the male connector 20 and the female connector 10 may be manufactured via extrusion, casting, injection molding, or other processes known in the art. The material type may be selected as a function of the desired mating between the male connector 10 and the female connector 20. For example, if larger forces are envisioned, then a strong material, such as aluminum or steel, may be selected. Further, material selection also may affect the amount of force for engaging and disengaging the male connector 20 and the female connector 10. Less elastic materials may call for additional force to mate the connectors, while more elastic materials may more easily mate. In alternative embodiments, the female connector 10 may be constructed from a first material that is different from a second material used to construct the male connector 20. In this way, a combination of material properties may be selected for the desired application.

The female connector 10 includes a hooked portion 14, a female contact surface 18, and a snap ledge 19. The snap ledge 19 includes a mating surface 12 for engaging a curved surface of the male connector 20. The female connector 10 also may include holes 31 for fasteners to attach the female connector 10 to a structure. The male connector 20 includes an engagement portion 24, a male contact surface 28, a lower structure 29, and a curved surface 22, 26. The hooked portion 14 and the engagement portion 24 may be designed to engage each other.

The hooked portion 14 is positioned near the upper part of the female connector 10 and forms a hook curved toward the snap ledge 19, which is near the lower part of the female connector 10. The curvature of the hooked portion 14 may be selected as a function of desired connection parameters. As shown, the curvature has a radius of ⅛ inch and an arc length of about ⅜ inch. If either the radius or the arc length are increased, then the surface area of the hooked portion 14 increases. This increase may raise the retention force of the connector assembly. For example, if the arc length of the hooked portion 14 is increased to about ½ inch, then the hooked portion 14 may capture more of the engagement portion 24 of the male connector 10, resulting in a potentially stronger connection between the female connector 10 and the male connector 20. Of course, those skilled in the art will recognize that either the radius or arc length of the hooked portion 14 may be decreased, as desired.

The engagement portion 24 of the male connector 10 may fit in the hooked portion 14 of the female connector 20. In the current embodiment, the engagement portion 24 is cylindrical or curved to fit the curvature of the hooked portion 14. Fitting the curvature of the hooked portion 14 may allow for close engagement and reduce play in the connector assembly. Of course, alternative embodiments may include engagement portions 24 and hooked portions 14 that are not curved to match each other.

The snap ledge 19, as shown, extends about ⅝ inch (width) from the contact surface 18 and is about 1/16 inch thick. The thickness, width, and shape of the snap ledge 19, as well as material selection, generally affect stiffness, which in turn affects the amount of force used to engage the connector assembly. For example, if the snap ledge 19 is stiffer, then the insertion force of the male connector 10 may increase. The thickness of the snap ledge 19 may vary from about 1/32 inch to ¼ inch, but may be thinner or thicker depending on the application. Further, the width of the snap ledge may vary depending on the application; and the shape of the snap ledge 19 also may vary depending on the particular application. For example, ridges along the bottom of the snap ledge 19 may be added to increase stiffness.

The mating surface 12 of the snap ledge 19 in the current embodiment is a ridge near the end of the snap ledge 19 opposite the contact surface 18, and extends for the length of the female connector 10. The mating surface 12 may engage the curved surface 22, 26 of the male connector 20 such that the male connector is captured by the female connector 10. The curved surface 22, 26 of the male connector 20 may be configured to snap-fit engage the mating surface 12 of the snap ledge 19. The first curved portion 22 and second curved portion 26 may act in tandem to engage the mating surface 12, and prevent the male connector 20 from freely releasing from the female connector 10. In alternative embodiments, the female connector 10 and the male connector 20 may be affixed together using screws or other suitable fasteners.

As shown in the current embodiment, the radius of the mating surface 12 is about 1/16 inch, and protrudes about 1/10 inch from the bottom of the snap ledge 19. The radius and depth of the second curved portion 26 may be selected to receive the mating surface 12. The radius and size of the first curved surface 22 may be selected depending on the desired snap-fit engagement or disengagement force. For example, the radius of the first curved surface 22 may be approximately 1/16 inch and protrude from the lower structure about 1/32 inch. In alternative embodiments, the radius and size of the mating surface 12 and curved surface 22, 26 may be increased or decreased for the desired engagement force.

Once the connector assembly is engaged, the female contact surface 18 and the male contact surface 28 may be coupled to each other. More specifically, the female contact surface 18 and the male contact surface 28 may directly contact each other. As downward force is applied to the male connector 10, the engagement between the hooked portion 14 and the engagement portion 24 may transfer the force to the female contact surface 18 and the male contact surface 28, causing them to more closely couple to each other and preventing sliding. In this way, the firmness of the mating between the female connector 10 and the male connector 20 may increase as downward force is increased. If a force is applied in the opposite direction, the snap ledge 19 and the curved portion 22, 26 may allow for relatively easy disengagement of the connector assembly. As shown, the female contact surface 18 and the male contact surface 28 are substantially flat, but of course, either may be contoured differently as desired in alternative embodiments.

The male connector of the current embodiment also includes a support structure 34 and a mounting surface 33. The mounting surface 33 may facilitate attaching the male connector 20 to an accessory; and under the load of an accessory, the support structure 34 may transfer force to the contact surface 28 and the engagement portion 24. The angle of the mounting surface 33, as shown, is about 35° with respect to the male contact surface 28. Of course, the angle of the mounting surface may vary depending on the type of the accessory. The connector assembly of the current embodiment may be used in a variety of applications, including a computer mouse holder, a scanner holder, a shelf, a television or computer monitor, a wall mounted media shelf for components (e.g., receivers, cable boxes, and gaming systems), a reconfigurable closet or pantry organizer, a reconfigurable refrigerator or freezer shelf, a quick disconnect for global positioning system (GPS) devices, a quick disconnect mount for marine electronics (e.g., sonar and fish finders), a mounting device for portable DVD players in a car, mounting of cantilever work surfaces and overhead storage for cubicle based office furniture, a reconfigurable yard tool hanger or garage organizer, tool boxes, a reel on the outside of a house, and mounting a DVD player under a wall-mounted TV.

Figure 6:
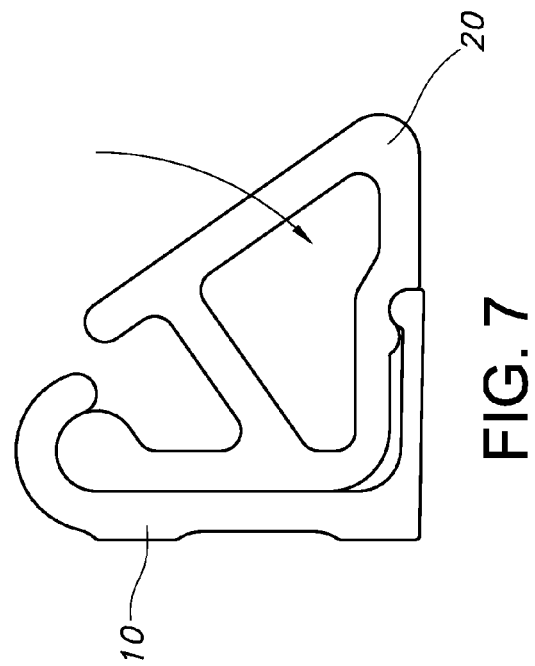
FIG. 6 is a cross section view of the snap-fit connector of the current embodiment being engaged.
Figure 7:
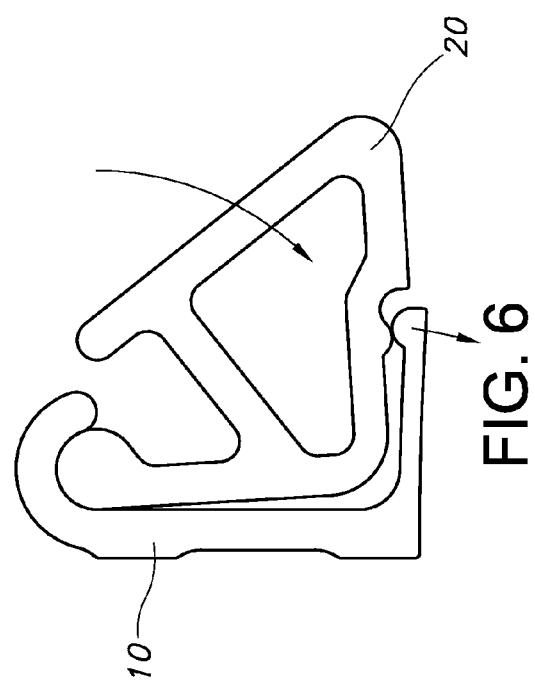
FIG. 7 is a cross section view of the snap-fit connector of the current embodiment being engaged.

Referring to FIGS. 4-7, various stages of engagement between the female connector 10 and the male connector 20 are shown. Beginning at FIG. 4, engagement portion 24 of the male connector 20 may be placed in a position to engage the hooked portion 14 of the female connector 10. At FIG. 5, the male connector 20 may be lifted such that the engagement portion 24 and the hooked portion 14 come into contact. Once the engagement portion 24 is in place, the male connector 20 may be rotated such that the curved surface 22, 26 contacts the snap ledge 19. As the male connector 20 is snapped into place, the snap ledge 19 may deflect to allow the mating surface 12 to seat in the curved surface 22, 26. This deflection is shown in FIG. 6. As mentioned above, the stiffness of the snap ledge 19 and the configuration of the mating surface 12 may affect the amount of force used to snap or lock the connector assembly together. FIG. 7 illustrates the connector assembly in a locked position as the female contact surface 18 and male contact surface 28 contact each other. The mating surface 12 and the curved surface 22, 26 also are engaged. Unlocking or un-snapping the connector assembly may be accomplished in a similar manner by reversing the direction of applied force.

Figure 8:
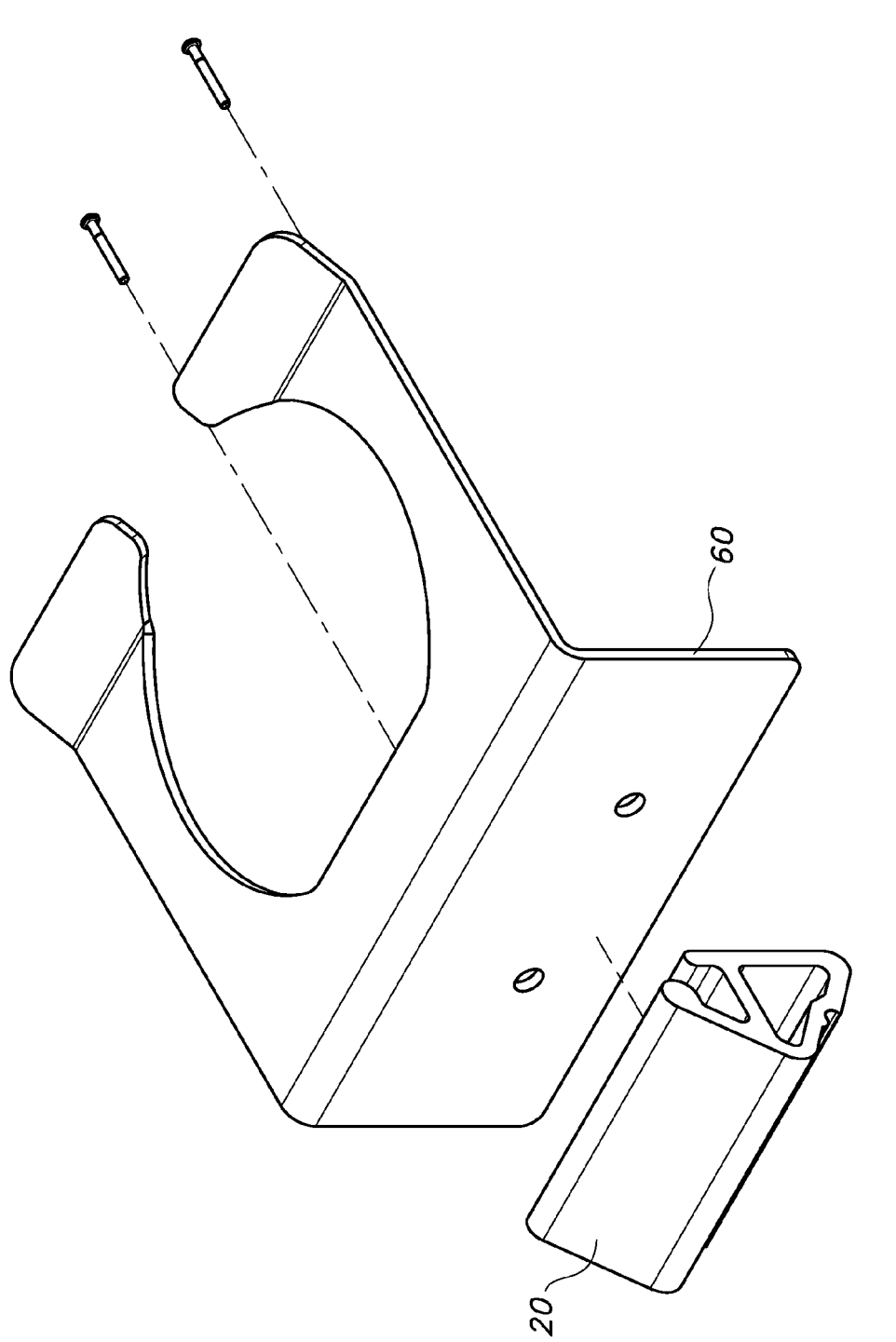
FIG. 8 is a perspective view of the male portion of the snap-fit connector of the current embodiment and a holder accessory.
Figure 9:
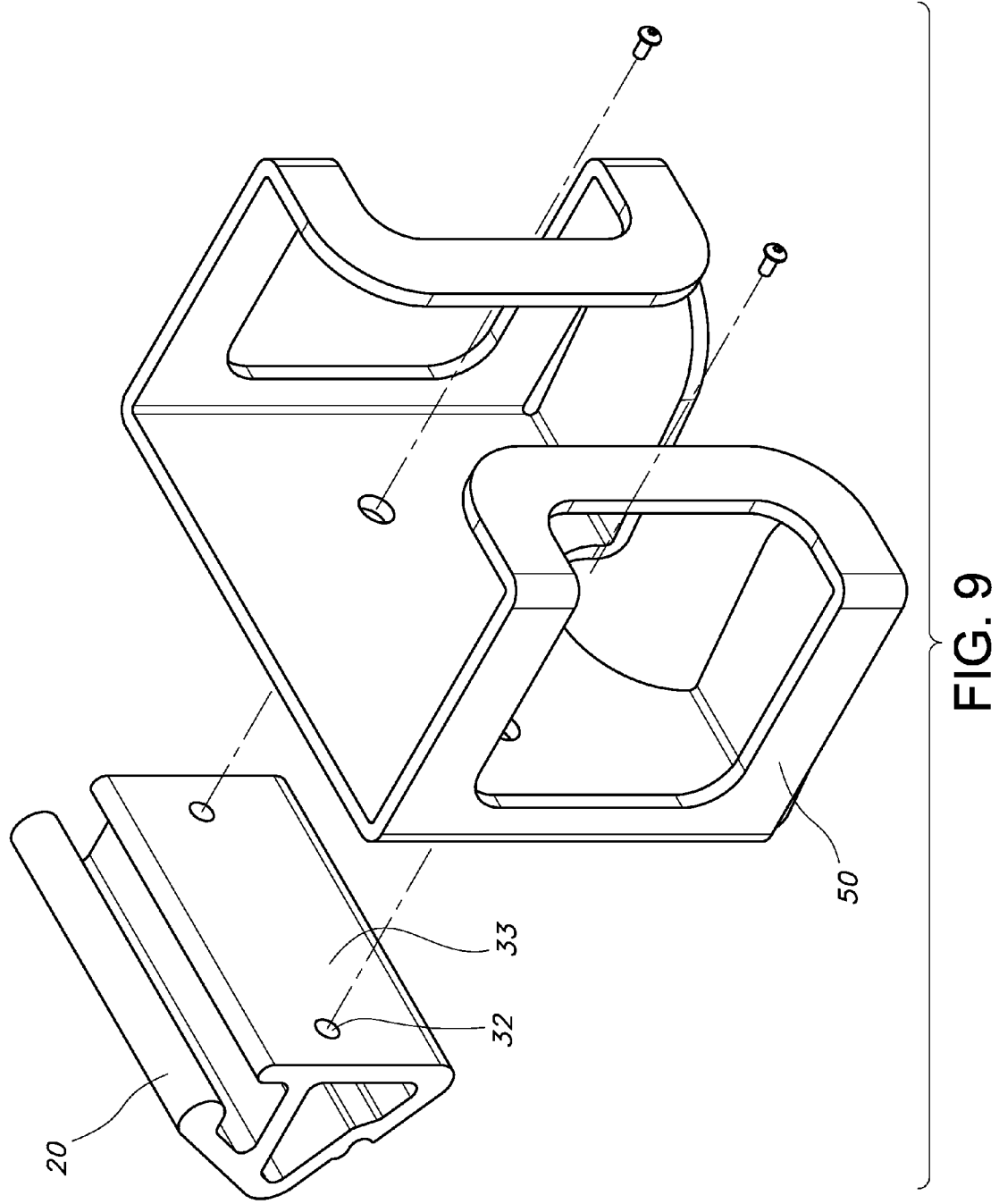
FIG. 9 is a perspective view of the male portion of the snap-fit connector of the current embodiment and another holder accessory.
Figure 10:
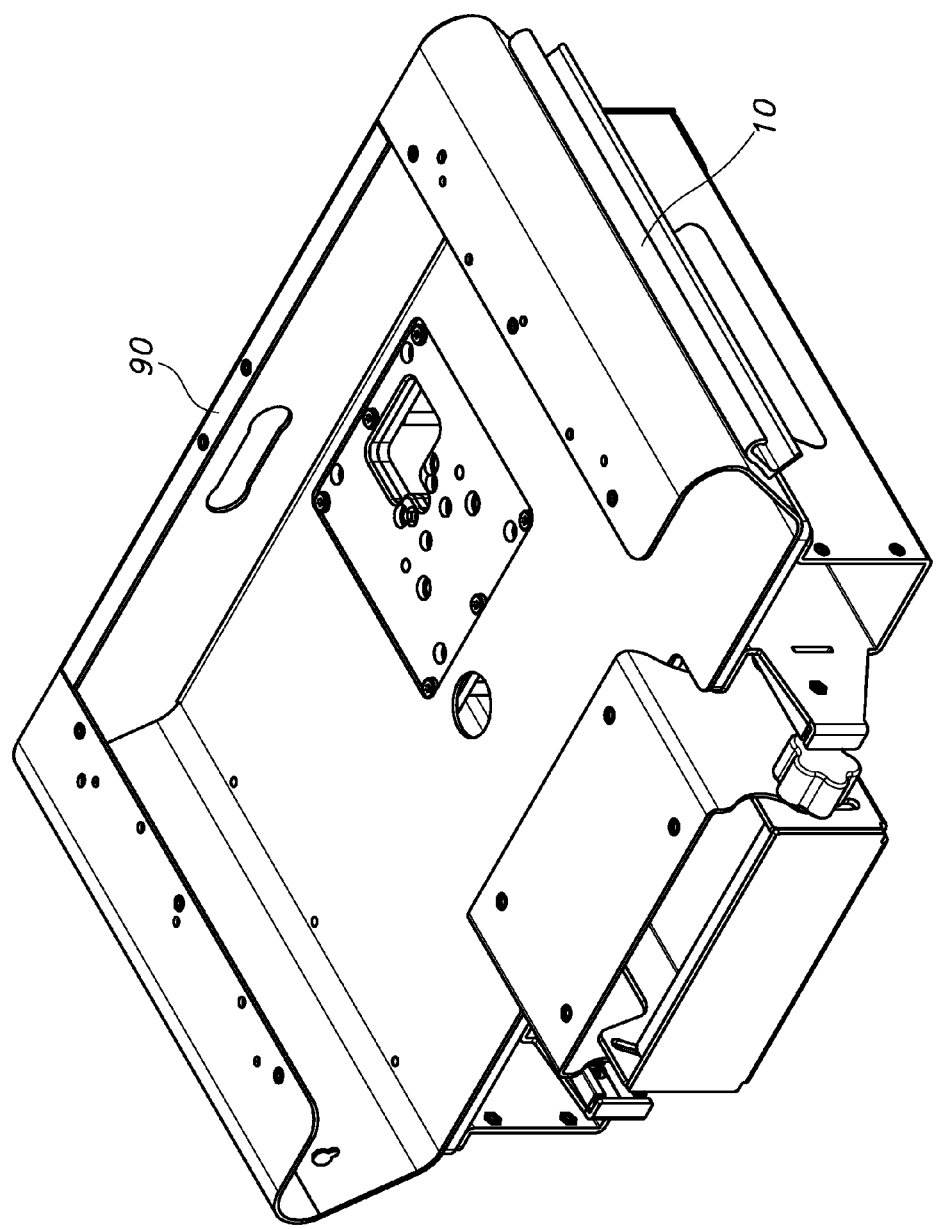
FIG. 10 is a perspective view of the female portion of the snap-fit connector of the current embodiment and a keyboard slide assembly.

FIGS. 8-10 illustrate the connector assembly attached to various accessories and structures. For example, a scanner holder 60 is shown in FIG. 8 attached to the male connector 20. Rivets, screws, or other suitable fasteners may attach the scanner holder 60 to the mounting surface 33 of the male connector 20. As another example, FIG. 9 illustrates a mouse holder 50 attached to the male connector 20 using similar fasteners. The mounting surface 33 and mounting holes 32 of the male connector 20 can be seen more easily from the perspective view of FIG. 9 as compared to FIG. 8.

FIG. 10 shows a sliding keyboard assembly 90 attached to a female connector 10. In this way, a variety of accessories may be removably attached to the sliding keyboard assembly 90. For example, the mouse holder 50 of FIG. 9 may be attached to the sliding keyboard assembly 90 using the connector assembly. A user has the choice of placing the mouse holder 50 or other accessory anywhere along the female connector 10, as desired for comfort and convenience. Further, another female connector 10 may be attached to the opposite side of the sliding keyboard assembly 90 or other attachment structure to accommodate a left or right handed preference. As an example, when the end of a user's work shift arrives and a new user begins working, the new user may re-position the accessories as desired. Of course, yet another female connector 10 may be attached to the front of the sliding keyboard assembly 90 to accommodate a left or right handed preference. Those skilled in the art will further appreciate that more than one accessory may be attached to the female connector 10. For example, both the scanner holder 60 and the mouse holder 50 may be attached to the same female connector 10 of the sliding keyboard assembly 90.

II. Second Embodiment

A second alternative embodiment of the connector assembly is illustrated in FIG. 11. This connector assembly is similar to the connector assembly of the current embodiment, with several exceptions. For example, the mounting surface 133 is parallel to the male contact surface 128, which may allow for different accessory orientations with respect to the female connector 110 and the attachment structure. Of course, the angle of the mounting surface may be different to accommodate other configurations.

The mating surface 112 and the curved surface 122, 126 of the second alternative embodiment are configured differently from the current embodiment. In this configuration, the groove of the curved surface 22, 26 shown in the current embodiment may be located on the snap ledge 119 as the mating surface 112, and the ridge of the mating surface 12 shown in the current embodiment may be located on the lower structure 129 as the curved surface 122, 126. That is, the snap configuration of the current embodiment may be reversed. Locking or snapping the connector assembly functions similarly to the operation of the current embodiment.

III. Third Embodiment

A third alternative embodiment of the connector assembly is illustrated in FIG. 12. This connector assembly is similar to the connector assembly of the current embodiment, with several exceptions. For example, the mounting surface 233 includes a ledge for attachment of an accessory or structure. The ledge may provide an additional attachment point for an accessory. As before, the mounting surface 233, including the ledge, may include holes or attachment points for affixing an accessory.

The mating surface 212a, 212b and the curved surface 222, 226a, 226b of the third alternative embodiment are configured differently from the current embodiment. In this configuration, the snap ledge 219 may include a mating surface 212a, 212b with at least two ridges. Likewise, the curved surface 222, 226a, 226b may be configured to include at least two grooves for engaging the mating surface 212a, 212b. The increased number of ridges and grooves may increase the amount of force called for to lock and unlock the connector assembly.

IV. Fourth Embodiment

A fourth alternative embodiment of the connector assembly is illustrated in FIG. 13. This connector assembly is similar to the connector assembly of the current embodiment, with several exceptions. For example, the male connector 320 may not include a support structure 34 as in the current embodiment. Further, the connector assembly may include a support beam 330, located below the snap ledge 319, that may provide additional strength to the assembly. For example, the support beam 330 may increase the locking or unlocking force of the connector assembly by adding strength to the snap ledge 319. Further, some of the downward force applied to the female connector 310 during use may be counteracted by the support beam 330.

V. Fifth Embodiment

A fifth alternative embodiment of the connector assembly is illustrated in FIGS. 14 and 16-17. This connector assembly is similar to the connector assembly of the current embodiment, with several exceptions. For example, the mating surface 412 and the curved surface 422, 426 is configured somewhat differently; although the locking and unlocking function is similar. As another example, the male connector 420 includes a support structure 437 that may be spaced apart from the lower structure 436. The support structure 437 may have the same width as the lower structure 436, or as shown, may be shorter in width than the lower structure 436. Of course, the support structure 437 may be longer as well.

As illustrated in FIGS. 16 and 17, a shelf 70 or other accessory may fit between the support structure 437 and the lower structure 436, and extend outward in the manner of a cantilever. As with other embodiments, more than one male connector 420 may be connected to the female connector 410 to support the shelf or other accessory. Of course, more than one female connector 410 may be used as well.

VI. Sixth Embodiment

A sixth alternative embodiment of the connector assembly is illustrated in FIG. 15. This connector assembly is similar to the connector assembly of the current embodiment, with several exceptions. For example, the mating surface 512 and the curved surface 522, 526 is configured somewhat differently; although the locking and unlocking function is similar. As another example, the male connector 520 includes a support structure 537 that may be spaced apart from the lower structure 536. The support structure 537 in this embodiment is about the same width as the lower structure 536 and may support an object in a manner similar to a cantilever.

With all of the embodiments described above, a separable connector assembly having strength and spatial freedom is provided.

The above description is that of the current embodiments of the connector assembly. Various alterations and changes can be made without departing from the spirit and broader aspects of the connector assembly. It is pointed out that the connector assembly disclosed herein extends to all alternative combinations of two or more of the individual features mentioned or evident from the text and/or drawings. All of these different combinations constitute various alternative aspects of the connector assembly.

The invention claimed is:

1. A connector assembly comprising:
a receiver connector including a first length defining a longitudinal direction, the receiver connector further including a first uniform cross section throughout the first length, the first cross section including first and second legs, the first leg including a convexly arcuate hinge half, the second leg defining a first locking portion; and
an attachment connector having a second length and a second uniform cross section throughout the second length, the second cross section including third and fourth legs, the third leg including a concavely arcuate hinge half fitted within the convexly arcuate hinge half, whereby the attachment connector is hinged with respect to the receiver connector about the interfitting hinge halves for movement in a direction transverse to the longitudinal direction, the fourth leg including a second locking portion interfitting with the first locking portion to releasably lock the attachment connector within the receiver connector in a mounted position, the third leg adjacent to and overlying the first leg, the fourth leg adjacent to and overlying the second leg, the second locking portion configured to be released from the first locking portion enabling the attachment connector to hinge away from the receiver connector in the transverse direction until the attachment connector can be withdrawn from the receiver connector in the transverse direction.

2. The connector assembly of claim 1 wherein the receiver connector includes a receiver contact surface between the first and the second legs, wherein the attachment connector includes an attachment contact surface between the third and fourth legs, wherein the receiver contact surface couples to the attachment contact surface in the mounted position, whereby the attachment contact surface decouples from the receiver connector surface as the attachment connector hinges away from the receiver connector.

3. The connector assembly of claim 2 wherein the receiver contact surface and the attachment contact surface directly contact each other.

4. The connector assembly of claim 1 wherein in the mounted position, the attachment connector is prevented from sliding in the longitudinal direction along the receiver connector.

5. The connector assembly of claim 1 wherein the first locking portion includes a snap ledge having a curved engagement configured to lock with the second locking portion in the mounted position.

6. The connector assembly of claim 1 wherein the attachment connector is adapted to be secured to an object and the receiver connector is adapted to be secured to a support.

7. The connector assembly of claim 6 wherein the object includes at least one of an accessory and an attachment structure.

8. A connector assembly comprising:
a receiver connector including a first length defining a longitudinal direction, the receiver connector further including a first substantially uniform cross section throughout the first length, the first cross section including first and second legs, the first leg including a receiver hinge half and the second leg including a receiver connector locking portion; and
an attachment connector having a second length, the attachment connector further including a second substantially uniform cross section throughout the second length, the second cross section including third and fourth receiver legs, the third leg including an engagement hinge half and the fourth leg including an attachment connector locking portion, the engagement hinge half of the third leg fitting within the receiver hinge half of the first leg, whereby the attachment connector is hinged with respect to the receiver connector about the interfitting hinge halves for movement in a direction transverse to the longitudinal direction, the attachment connector locking portion interfitting with the receiver connector locking portion to releasably lock the attachment connector within the receiver connector in a mounted position, the attachment connector locking portion configured to release from the receiver connector locking portion enabling the attachment connector to hinge away from the receiver connector in the transverse direction until the attachment connector is withdrawn from the receiver connector in the transverse direction.

9. The connector assembly of claim 8 wherein the receiver connector includes a receiver contact surface between the first and the second legs, wherein the attachment connector includes an attachment contact surface between the third and fourth legs, wherein the receiver contact surface couples to the attachment contact surface in the mounted position, whereby the attachment contact surface decouples from the receiver connector surface as the attachment connector hinges away from the receiver connector.

10. The connector assembly of claim 9 wherein the receiver contact surface and the attachment contact surface directly contact each other.

11. The connector assembly of claim 8 wherein in the mounted position, the attachment connector is prevented from sliding in the longitudinal direction along the receiver connector.

12. The connector assembly of claim 8 wherein the receiver hinge half includes a convexly arcuate hinge half, and wherein the attachment hinge half includes a concavely arcuate hinge half fitted within the convexly arcuate hinge half, wherein the receiver hinge half is adjacent to and overlies the attachment hinge half.

13. The connector assembly of claim 8 wherein the receiver connector locking portion includes a snap ledge having a curved engagement configured to lock with the attachment connector locking portion in the mounted position.

14. The connector assembly of claim 8 wherein the attachment connector is adapted to be secured to an object and the receiver connector is adapted to be secured to a support.

15. The connector assembly of claim 14 wherein the object includes at least one of an accessory and an attachment structure.

16. The connector assembly of claim 14 wherein the support supports the object through the connector assembly, whereby the attachment connector applies at least a first force component and second force component on the receiver, the first force being opposite the second force.

17. A connector assembly comprising:
a receiver including a first length defining a longitudinal direction, the receiver including a first substantially uniform cross section throughout the first length, the first cross section including a receiver hinge half and a receiver locking portion; and
an attachment having a second length and including a second substantially uniform cross section throughout the second length, the second cross section including an engagement hinge half and an attachment locking portion, the engagement hinge half fitting within the receiver hinge half, whereby the attachment is hinged with respect to the receiver about the interfitting hinge halves for movement in a direction transverse to the longitudinal direction, the attachment locking portion interfitting with the receiver locking portion to releasably lock the attachment within the receiver in a mounted position, the attachment locking portion configured to release from the receiver locking portion enabling the attachment to hinge away from the receiver in the transverse direction until the attachment is withdrawn from the receiver in the transverse direction.

\* \* \* \* \*